United States Patent [19]

Roos

[11] Patent Number: 4,871,228

[45] Date of Patent: Oct. 3, 1989

[54] IMAGE TRANSFER APPARATUS UTILIZING OPTICAL FIBERS

[75] Inventor: Jan Roos, Eindhoven, Netherlands

[73] Assignee: U.S. Philips Corporation, New York, N.Y.

[21] Appl. No.: 828,085

[22] Filed: Feb. 7, 1986

Related U.S. Application Data

[63] Continuation of Ser. No. 516,163, Jul. 20, 1983, abandoned.

[30] Foreign Application Priority Data

Jul. 21, 1982 [NL] Netherlands .......................... 8202935

[51] Int. Cl.$^4$ ............................................. G02B 6/06
[52] U.S. Cl. ............................ 350/96.25; 350/96.24; 350/96.27; 350/330; 358/901
[58] Field of Search ............... 350/96.10, 96.15, 96.24, 350/96.25, 96.26, 96.27, 96.28, 330; 250/227; 358/901

[56] References Cited

U.S. PATENT DOCUMENTS

| | | | |
|---|---|---|---|
| 3,043,910 | 7/1962 | Hicks | 350/96.27 |
| 3,226,589 | 12/1965 | Woodcock | 350/96.24 |
| 3,323,886 | 6/1967 | Hays | 350/96.24 |
| 3,402,000 | 9/1968 | Crawford | 350/96.25 |
| 3,519,742 | 7/1970 | Bjelland | 358/901 |
| 3,604,780 | 9/1971 | Martin | 350/96.24 X |
| 3,668,304 | 6/1972 | Eilenberger | 350/96.25 |
| 3,728,422 | 4/1973 | Sugaya | 350/96.24 |
| 3,907,403 | 9/1975 | Maeda | 350/96.27 |
| 3,937,561 | 2/1976 | Peterson et al. | 350/96.25 |
| 4,116,739 | 9/1978 | Glenn | 350/96.25 |
| 4,173,391 | 11/1979 | Schure et al. | 350/96.25 |
| 4,427,977 | 1/1984 | Carollo et al. | 358/901 |
| 4,650,280 | 3/1987 | Sedlmayr | 350/96.27 |
| 4,738,510 | 4/1988 | Sansom | 350/96.25 |
| 4,747,648 | 5/1988 | Gilliland, III | 350/96.25 |
| 4,773,730 | 9/1988 | Sedlmayr | 350/96.27 |
| 4,786,139 | 11/1988 | Sedlmayr | 350/96.27 |
| 4,812,012 | 3/1989 | Terada et al. | 350/96.24 |
| 4,815,816 | 3/1989 | Schneider | 350/96.25 |

FOREIGN PATENT DOCUMENTS

| | | | |
|---|---|---|---|
| 1512126 | 4/1970 | Fed. Rep. of Germany | 350/96.24 |
| 1399953 | 7/1975 | United Kingdom | 350/96.24 |

*Primary Examiner*—William L. Sikes
*Assistant Examiner*—Brian M. Healy

[57] ABSTRACT

An image magnifier for an image transfer apparatus comprises a multitude of fibres (2) arranged in laminar fibre arrays (3). The fibre arrays (3) are superimposed at the entrance face (4) and are disposed at the desired pitch from each other at the exit face (5). The fibre arrays (3) also extend at a minimal angle to the exit face (3). In the fibre arrays (3) the pitch of the fibres (2) decreases to the same pitch as that of the fibres (2) at the entrance face (4) within a minimal distance from the exit face (5), in such a way that the fibres (2) join each other substantially at the level of the orthogonal side (6) of the rectangular exit face (5). From this location the fibres (2) extend as a strip of parallel fibres in the direction perpendicular to the orthogonal side (7) of the exit face (5) and are subsequently bent towards the entrance face (4). By thus stacking the fibre arrays (3) the image magnifier has a much smaller depth at the location of these parts of the fibre arrays (3) where the pitch of the fibres (2) changes from the pitch at the exit face (5) to the pitch at the input face (4) than at the location where the fibres (2) are arranged in strips. This smaller depth is utilized in order to accommodate one or more image-display devices with associated optics and electronics. The images of the image-display devices are presented to the entrance face (4) and can be observed in magnified form at the exit face.

17 Claims, 4 Drawing Sheets

IMAGE TRANSFER APPARATUS UTILIZING OPTICAL FIBERS

This is a continuation of division of U.S. application Ser. No. 516,163, filed July 20, 1983, now abandoned.

BACKGROUND OF THE INVENTION

The invention relates to an image transfer apparatus comprising at least one image display device and an image magnifier which comprises a bundle of fibres and has a substantially rectangular entrance face and a substantially rectangular exit face, the pitch of the fibres at the exit face being greater than that at the entrance face.

Such apparatus is known from German Pat. Specification No. 1,512,126. In this apparatus the image display device comprises a picture tube which is arranged adjacent to the exit face of the image magnifier and whose axis is disposed parallel to one side of the rectangular exit face. The face plate of the picture tube is coupled to the entrance face of the image magnifier. An image displayed on the face plate is transferred to the exit face by internal reflection in the fibres, the light emerging from the fibres at the exit face. The image magnification depends on the ratio of the fibre pitch at the exit face and that at the entrance face.

In this known apparatus the fibres are first bent from the entrance face to the exit face and are then bent in a direction perpendicular to the exit face. As a result, the image magnifier has a comparatively small depth. The picture tube and the associated electronics are accommodated in a space around the image magnifier. This space makes the overall volume of the image transfer apparatus comparatively large. This space becomes particularly large if the image transfer apparatus comprises three picture tubes, for reproducing images in the colors red, green and blue, instead of one monochrome picture tube.

SUMMARY OF THE INVENTION

It is the object of the invention to provide an image transfer apparatus having a minimal volume. To this end, an image transfer apparatus of the type mentioned in the opening paragraph is characterized in that:

(a) the fibres are arranged in laminar fibre arrays which are substantially juxtaposed at the entrance face and which are arranged at the desired pitch from each other at the exit face, (b) in each laminar fibre array the fibre pitch decreases, starting from the exit face, from the pitch at the exit face to the same pitch as the fibres at the entrance face within a minimal distance, (c) the location where the fibres have substantially the same pitch as at the entrance face is located substantially at the level of a first orthogonal side of the exit face, which side extends perpendicularly to the intersection of the laminar fibre array with the exit face, (d) from the location where the fibres have substantially the same pitch as at the entrance face the fibres extend towards the entrance face as a strip of parallel fibres, and (e) at least that part of each laminar fibre array in which the pitch of the fibres decreases from the pitch at the exit face to the same pitch as at the entrance face extends at a minimal acute angle to the exit face.

The invention is based on the recognition that by arranging the fibres in laminar fibre arrays from the exit face to the first orthogonal side of the exit face over a minimal distance and by bending the fibre array as flatly as possible against the exit face, the volume required for the image magnifier can be reduced substantially. The space which now becomes available is employed to accommodate the image display device(s) with associated electronics and optics completely or partly depending on the dimensions. From the location where the fibres for the first time have the same pitch as at the entrance face, the fibres extend as a strip of parallel fibres to the entrance face which, depending on the arrangement of the image display device(s), may be arranged at a more or less arbitrary location in the available space. This results in an image transfer apparatus whose volume is substantially equal to the volume previously occupied by the image magnifier alone.

A first embodiment of an image transfer apparatus in accordance with the invention is characterized in that the entrance face is disposed in a plane which is substantially parallel to a plane perpendicular to the exit face and passing through a second orthogonal side of the exit face, perpendicular to the first orthogonal side.

A second embodiment of an image transfer apparatus in accordance with the invention is characterized in that the entrance face is disposed in a plane which is substantially parallel to a plane perpendicular to the exit face and passing through the first orthogonal side of the exit face.

A third embodiment of the image transfer apparatus in accordance with the invention is characterized in that one half of the fibre arrays are disposed mirror-symmetrically relative to the other half of the fibre arrays, the mid-perpendicular plane through the first orthogonal side of the exit face being the plane of symmetry.

A fourth embodiment is characterized in that the exit face is formed by a face plate having a light-absorbing surface, which face plate is provided with apertures in which the fibre ends are arranged. A light-absorbing face plate does not reflect the ambient light, so that the contrast of the observed image is maximal. In a further embodiment, the face plate may comprise strips having a light-absorbing surface, in which or on which the fibre ends are arranged. A further embodiment is characterized in that the fibre ends are provided with an anti-reflection coating. This precludes reflection of ambient light from the fibre ends.

A fifth embodiment is characterized in that at the side of the exit face the fibre ends are formed with corrugations, at least in a direction parallel to one of the orthogonal sides of the exit face. In the case of fibres having flat ends, the light exit aperture, i.e. the so-called viewing angle, is comparatively small. This viewing angle is increased by forming the fibre ends with corrugations. Since for normal use of the apparatus the viewing angle should be magnified mainly in the horizontal direction, it suffices to form corrugations in the horizontal direction. A further embodiment is characterized in that a transparent plate is arranged on the exit face, the spaces between the fibre ends and the plate being filled with a paste, the refractive index of which is equal to the refractive index of the plate. The plate provides protection against damage to the exit face. Because they have the same refractive index, the plate and the paste are optically similar, so that the spaces between the plate and the fibres will not distort the image.

A sixth embodiment is characterized in that a transparent plate is arranged on the exit face, which plate is formed with corrugations at the side which faces the exit face, which corrugations extend at least parallel to one of the orthogonal sides of the exit face. Instead of forming the fibres with corrugations, it is possible to arrange a corrugated plate on the exit face. This plate may also serve to protect the exit face.

A seventh embodiment is characterized in that at the entrance face the fibres are compressed in such a way that no spaces are left between the fibres. In order to transmit a maximum portion of the light from the image display apparatus to the exit face, the fibres at the input face should be packed as densely as possible. The entrance face is compressed to ensure that no light is lost via the spaces between the fibres.

An eighth embodiment is characterized in that at the entrance face the fibres are provided with an anti-reflection coating. This precludes a loss of light by reflection from the entrance face.

A ninth embodiment is characterized in that at the entrance face the fibres are provided with a light-absorbing cladding. This precludes cross-talk of light between adjacent fibres as a result of the compression of the fibres.

A tenth embodiment is characterized in that the apparatus comprises a monochrome or a color-picture tube as a display device. A further embodiment is characterized in that the picture tube is provided with a glass-fibre face plate.

An eleventh embodiment is characterized in that the apparatus comprises three picture tubes which luminesce in the colors red, green and blue, a dichroic mirror array, and a lens system. By means of the dichroic optical cross, the red, the green and the blue images are brought into register, and by means of the lens system the registered image is projected on the entrance face of the image magnifier, so that a colored image can be observed at the exit face.

A twelfth embodiment is characterized in that the image display device is formed by a controllable light modulator. This modulator may, for example, be an electro-optical display, such as a liquid-crystal display, an electrochrome display or an electrophoretic display, or another type of passive display such as a magneto-optical display. In the case of transmissive displays, the display is coupled directly to the entrance face of the image magnifier. The display modulates the light from a light source in accordance with the information applied to the display. In the case of reflective displays, the image reflected by the display is projected onto the entrance face of the image magnifier.

DESCRIPTION OF THE PREFERRED EMBODIMENTS

Figure 1A:
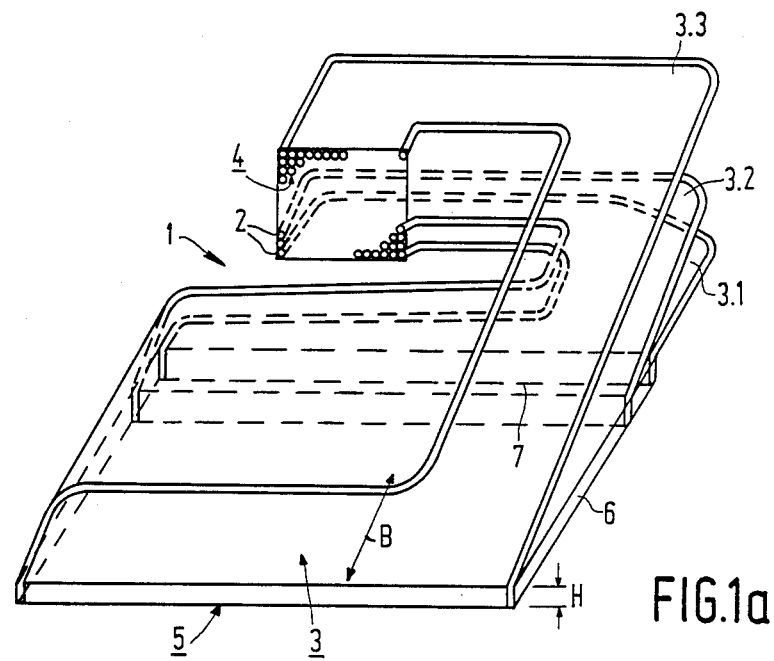
FIG. 1a is a schematical perspective view of a first version of an image magnifier for an image-transfer apparatus in accordance with the invention.

FIG. 1a is a schematic perspective view of an image magnifier for an image transfer apparatus in accordance with the invention. The image magnifier 1 comprises a bundle of fibres 2. The fibres are arranged in laminar fibre arrays 3, three of which are designated 3.1, 3.2 and 3.3 in the Figure. In the laminar fibre arrays 3 the fibres 2 may be arranged on a supporting foil, either completely or at both ends. At the entrance face 4 the laminar fibre arrays 3 are juxtaposed. At the exit face 5 the laminar fibre arrays 3 have a pitch which is dictated by the desired image magnification. The rectangular exit face 5 has a first orthogonal side 6 and a second orthogonal side 7 perpendicular to the first orthogonal side 6.

Figure 1B:
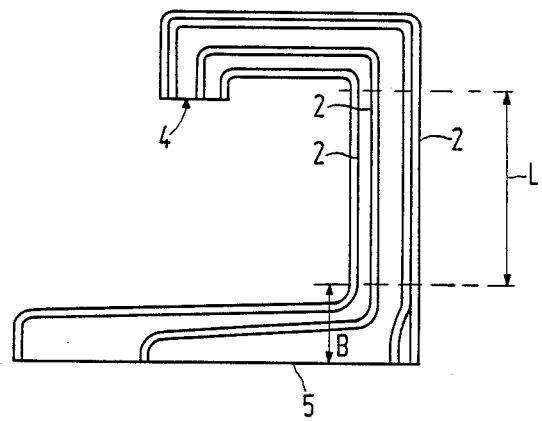
FIG. 1b is a plan view of a laminar fibre array as shown in FIG. 1a, FIG. 1c is a front view of the image magnifier shown in FIG. 1a, FIGS. 2a and 2b respectively show a plan view and a side view of a first embodiment of an image transfer apparatus equipped with a first version of the image magnifier.
Figure 1C:
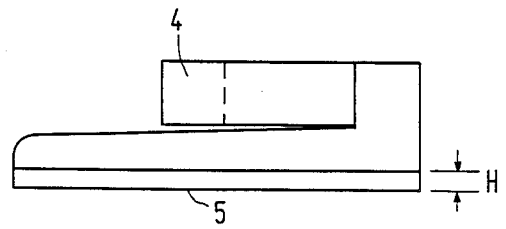

In order to obtain a light exit pattern whose axis is perpendicular to the exit face, the ends of the fibres 2 are positioned perpendicularly to the exit face 5. For simplicity, the fibres 2 are shown as straight fibres whenever possible. The space required for bending the fibres 2 perpendicularly to the exit face 5 is the part whose depth is designated H in the Figure. FIG. 1b is a plan view of a fibre array 3. At a minimal distance B from the exit face 5 the pitch of the fibres 2 changes from the pitch at the exit face 5 to the pitch of the fibres 2 at the entrance face 4. The distance B is equal for each fibre array 3 and depends on the number of fibres 2 in each fibre array 3. From the location where the fibres 2 are juxtaposed the fibres 2 extend as a strip of parallel fibres 2 in a direction substantially perpendicular to the second orthogonal side 7, after which they are diverted towards the entrance face 4. The entrance face 4 extends substantially parallel to a plane perpendicular to the exit face 5 and passing through the second orthogonal side 7. The length of the part of the strip of parallel fibres 2 which extends parallel to the first orthogonal side 6 differs for each fibre array 3. The fibre arrays 3 are arranged at a minimal angle to the exit face 5. The fibre array 3.1 (see FIG. 1a) is disposed against the exit face 5. The fibre arrays on this face, up to the fibre array 3.2, each extend at a slightly greater angle relative to the exit face 5. The fibre arrays 3.2 to 3.3, which form the majority of the fibre arrays, all extend at the same angle to the exit face 5, which angle is determined by the diameter of the fibres 2 and the pitch of the fibres in the fibre arrays 3. Since the fibre arrays 3 are disposed as flatly as possible against the exit face, the depth of the image magnifier at the location of those parts of the fibre arrays 3 where the fibres 2 are spaced from each other within the range B is substantially smaller than at the location where the fibres 2 are arranged in strips. The depth of the parts of the fibre arrays 3 within the range B is determined by the fibre pitch of the fibre arrays 3, the dimension B, and the diameter of the fibres 2. To illustrate this, FIG. 1c shows a front view of the image magnifier. The space saved as a result of the smaller depth is utilized entirely or mostly to accommodate the image-display device(s) with associated electronics. The image magnifier comprises, for example, 800 fibre arrays 3 each comprising 100 fibres 2 of a diameter of 0.125 mm. The pitch of the fibres 2 at the entrance face 4 is 0.125 mm. The entrance face 4 then has a size of approximately 0.125×0.100 m². The pitch of the fibres 2 at the exit face 5 is 1.25 mm, so that the size of the exit face 5 is 1.25×1.00 m². As a result of this, the image magnifier 1 transfers the image presented to the entrance face 4 to the exit face 5 with a magnification factor of approximately 10. For a fibre diameter of 0.125 mm, a safe curvature is approximately 1 cm, so that the distance H is approximately 1 cm. For a pitch of 1.25 mm at the exit face 5 the distance B is approximately 12.5 cm. The height at the location of the parts of the fibre arrays 3 within the range B is then approximately 1.3 cm. The image magnifier 1 then has a depth of approximately 2.3 cm at the location of these parts of the fibre arrays 3, i.e. for approximately 90% of the surface area of the exit face 5. The volume originally required for the image magnifier is 0.17 m³. For the image magnifier in accordance with the invention, this volume is reduced by approximately 0.14 m³, i.e. a reduction by approximately 80%. This space is employed to accommodate the image display device with associated optics and electronics.

Figure 2A:
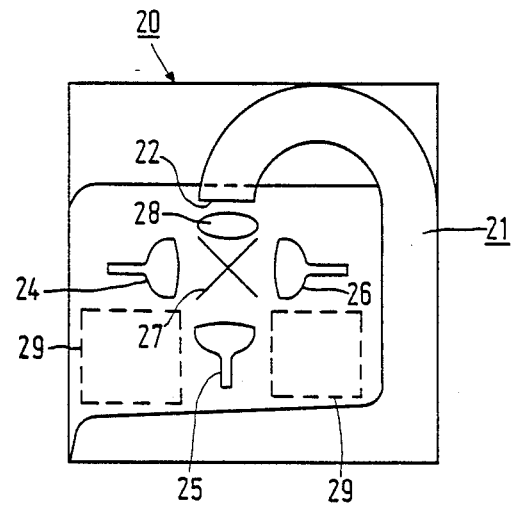
Figure 2B:
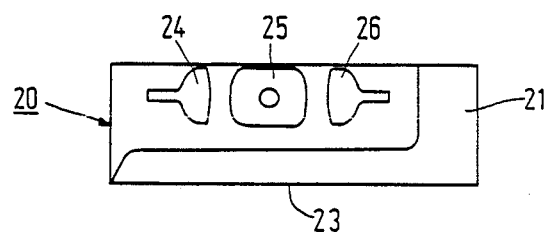

A first embodiment of an image transfer apparatus comprising such an image magnifier is described with reference to FIGS. 2a and 2b, which schematically represent a plan view and a side view of the apparatus. The image magnifier 21 is accommodated in a box-shaped enclosure 20, whose side 23 forms the exit face. At the location of the part of smaller depth of the image magnifier 21, three monochrome picture tubes 24, 25 and 26 are arranged for producing a red, a green and a blue image respectively. The picture tubes 24, 25 and 26 are projection picture tubes with a high luminous efficiency and small dimensions. The face-plate diagonal of the picture tubes 24, 25 and 26 is, for example, 12 cm, so that the overall height of a picture tube is approximately 10 cm. The images of the picture tubes 24, 25 and 26 are imaged onto the entrance face 22 of the image magnifier 21 by means of an array of dichroic mirrors 27 and a lens system 28. The electronics for driving the picture tubes 24, 25 and 26 are accommodated in the schematically represented spaces 29. This results in a very compact image-transfer apparatus of small depth.

It is to be noted that instead of three picture tubes, the image transfer apparatus may be equipped with one monochrome or one color picture tube. The input face of the image magnifier may then be coupled directly to the face plate of the picture tube. Suitably, the face plate may then be constructed as a so-called glass fibre face plate, which is known from U.S. Pat. Ser. No. 3,226,589.

Figure 3:
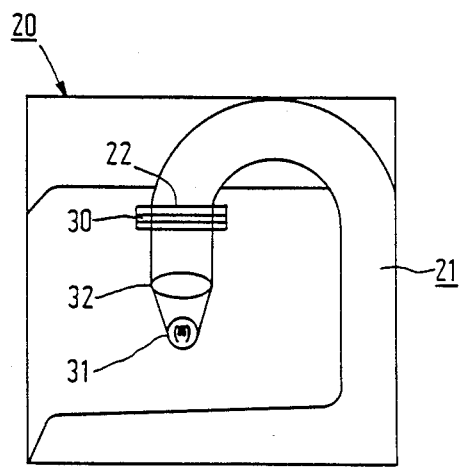
FIG. 3 is a plan view of a second embodiment of an image transfer apparatus provided with the first version of the image magnifier.

A second embodiment of an image transfer apparatus in accordance with the invention will be described with reference to a plan view shown in FIG. 3. Identical parts bear the same reference numerals as in FIG. 2a. The present embodiment differs from the apparatus shown in FIG. 2a in that instead of picture tubes, a passive liquid-crystal display 30 is used as the display device. The liquid-crystal display 30 is coupled directly to the entrance face 22 of the image magnifier 21. The liquid-crystal display 30 is operated in the transmission mode. The apparatus comprises a light source 31 which projects a parallel light beam onto the display 30 by means of a lens system 32. The display 30 modulates the light in accordance with the picture information applied to the display. The liquid-crystal display may also be operated in reflection instead of in transmission, the reflected image being imaged onto the entrance face 22 of the image magnifier 21 by a lens system. Alternatively, the apparatus may be equipped with three displays which modulate the light from a light source emitting red, green and blue light respectively. By means of lens systems the modulated light is imaged onto the entrance face of the image magnifier. Apart from liquid-crystal displays the image-transfer apparatus may employ any kind of electro-optical display such as electrochrome and electrophoretic displays or a magneto-optical display or another type of passive display.

Figure 4:
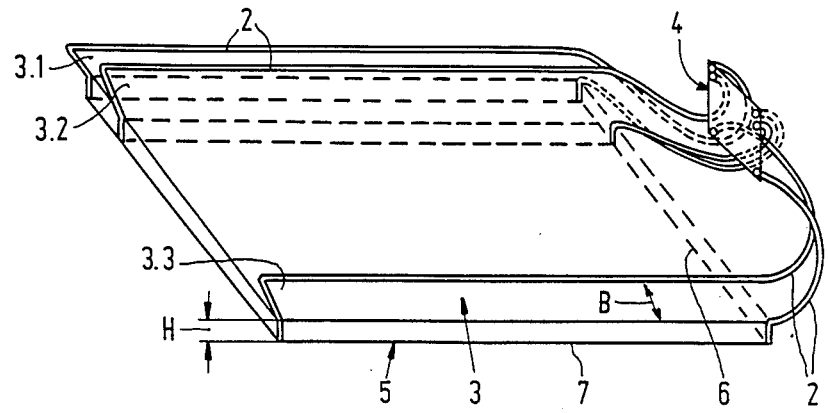
FIG. 4 is a schematic perspective view of a second version of an image magnifier for an image transfer apparatus in accordance with the invention.

FIG. 4 is a schematic perspective view of a second version of an image magnifier for an image-transfer apparatus in accordance with the invention. Similar parts bear the same reference numerals as in FIG. 1a. The fibres 2 are again arranged in laminar fibre arrays 3 which extend at a minimal angle to the exit face 5. In the fibre arrays 3 the pitch of the fibres 2 again changes, within a minimal distance B, from the pitch of the fibres 2 at the exit face 5 to the pitch of the fibres 2 at the entrance face 4, in such a way that the fibres 2 are juxtaposed substantially at the location of the orthogonal side 6 of the exit face 5. From this location the fibres extend as a strip of parallel fibres 2 substantially in a direction perpendicular to the orthogonal side 6 of the exit face 5 and are subsequently bent towards the entrance face 4. The entrance face 4 extends substantially parallel to a plane perpendicular to the exit face 5 through the exit face side 6. At the location where the fibre pitch in the fibre arrays 3 has decreased from the pitch at the exit face 5 to the pitch at the entrance face 4, the image magnifier again has a very small depth. The space saved is again utilized for accommodating the image display device(s) with the associated electronics and optics. An image transfer apparatus comprising an image magnifier as shown in FIG. 4 can be constructed in the same way as shown in FIGS. 2a and 2b. Instead of three picture tubes, the image transfer apparatus may again be equipped with one monochrome or color picture tube or with a passive display.

Figure 5:
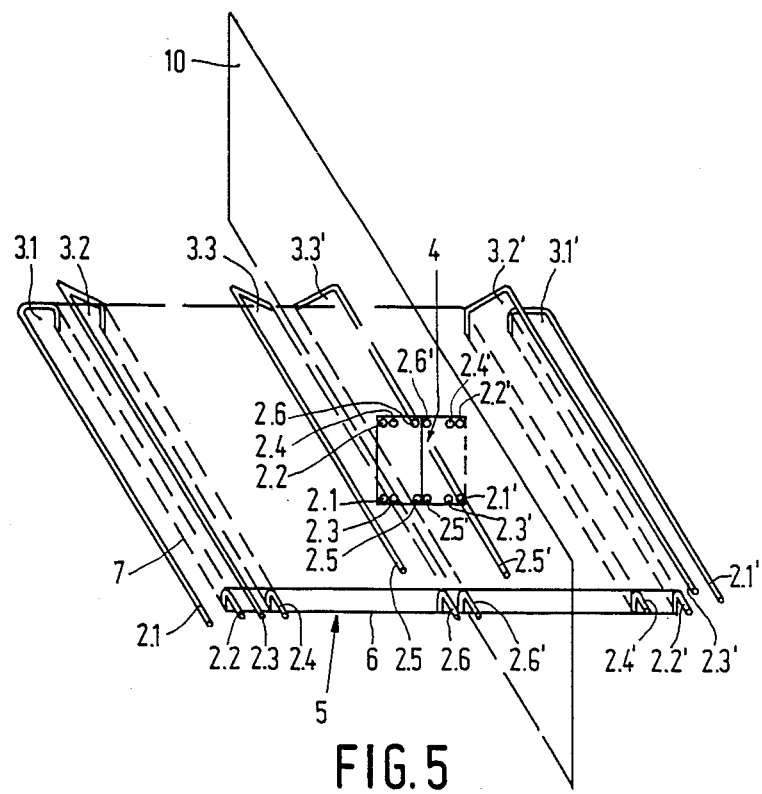
FIG. 5 is a schematic perspective view of a third version of an image magnifier for an image transfer apparatus in accordance with the invention.

FIG. 5 is a schematic perspective view of a third version of an image magnifier for an image-transfer apparatus in accordance with the invention. Corresponding parts bear the same reference numerals as in FIG. 1a. The image magnifier is constructed mirror-symmetrically, the mid-perpendicular plane 10 which extends through the orthogonal side 6 of the exit face 5 being the plane of symmetry. The fibres 2 are again arranged in laminar fibre arrays 3. One half of the fibre arrays, of which the fibre arrays 3.1, 3.2 and 3.3 are shown in the Figure, are situated on one side of the mid-perpendicular plane 10 and the other half of the fibre arrays, of which the fibre arrays 3.1', 3.2' and 3.3' are shown in the Figure, are disposed mirror-symmetrically on the other side of the mid-perpendicular plane 10. All fibre arrays 3 again make a minimal angle with the exit face 5. In the fibre arrays 3 the pitch of the fibres 2 again changes within a minimal distance from the pitch of the fibres 2 at the exit face 5 to the pitch of the fibres 2 at the entrance face 4 in such a way that the fibres 2 are substantially juxtaposed at the location of the first orthogonal side 6 of the exit face 5. For clarity FIG. 5 does not show how the fibres 2 extend from the location where the fibres 2 are juxtaposed to the entrance face 4 as a strip of parallel fibres 2. Only the positions of the ends of the fibres 2 at the entrance face 4 are shown. The fibres of the fibre arrays 3.1 to 3.3 are designated 2.1 to 2.6 and those of the fibre arrays 3.1' to 3.3' are designated 2.1' to 2.6'. As a result of this superposition of the fibre arrays 3, the image magnifier again has a very small depth over a substantial part of the surface area of the exit face 5. The space saved is again employed to accommodate image display device(s) with associated electronics and optics.

Figure 6:
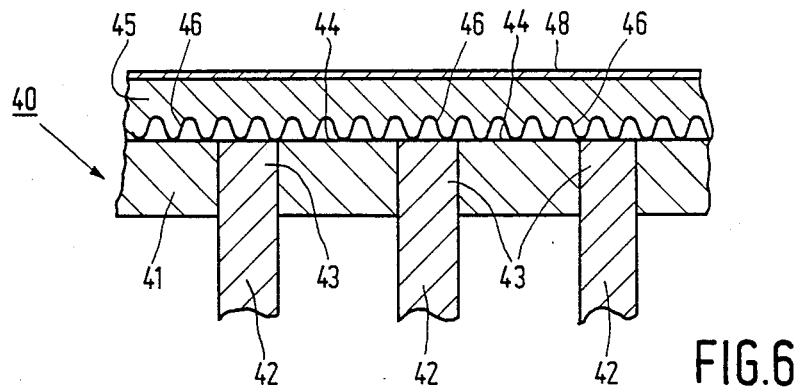
FIG. 6 is a sectional view of a part of a first version of the exit face.

FIG. 6 is a sectional view of a part of a first version of the exit face of the image magnifier. The exit face 40 is formed by a face plate 41 in which the ends 43 of the fibres 42 are arranged. The fibre ends occupy only 1% of the surface area of the face plate 41. The face plate 41 has a light-absorbing matt-black surface 44, which does not reflect the ambient light. This results in an optimum contrast of the image which is observed. On the face plate 41 a transparent plate 45 is arranged which is provided with an anti-reflection coating 48. At the side facing the face plate 41 this transparent plate 45 is formed with corrugations 46. These corrugations 46 enlarge the exit angle of the light from the fibres 42 and thus the viewing angle of the observer. Since during normal use a large viewing angle is mainly required in the horizontal direction, the corrugations 46 need only be formed in one direction, namely parallel to the vertical side of the exit face 40.

Figure 7:
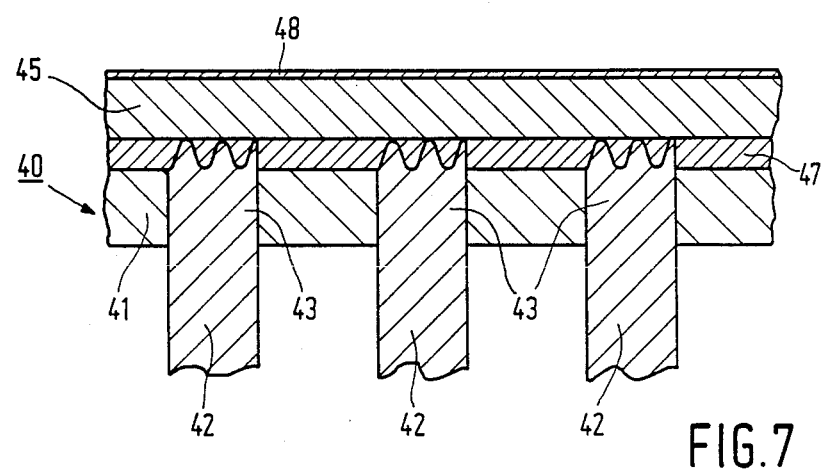
FIG. 7 is a sectional view of a part of a second version of the exit face.

FIG. 7 is a sectional view of a part of a second version of the exit face. In this version the ends 43 of the fibres 42 are corrugated instead of a plate. On the face plate 41 a transparent plate 45 is arranged for the purpose of protection, which plate is provided with an anti-reflection coating 48. The spaces between the plate 45 and the face plate 41 are filled with a paste 47 the refractive index of which is equal to that of the plate 45. The plate 45 and the paste 47 are therefore optically identical, so that the image will not be distorted when light emerges from the fibres 42 due to refraction at the inner surface of the plate 45.

Instead of being formed by a face plate in which the ends of the fibres are arranged, the exit face 40 may alternatively be formed by a stack of matt-black strips, which are formed with slots in which the fibres are fitted.

Figure 8:
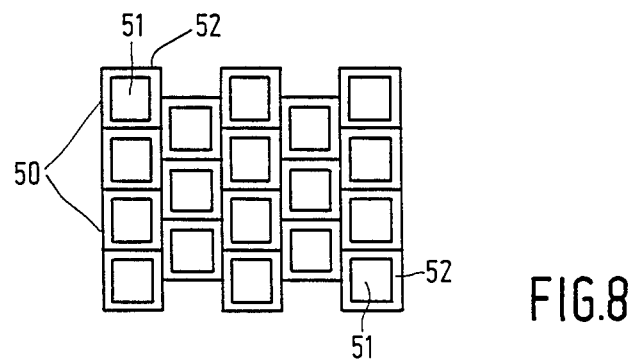
FIG. 8 is a view of a part of the entrance face of the image magnifier.

FIG. 8 is a view of a part of the entrance face of the image magnifier. The fibres 50 each comprise a core 51 with a cladding 52. The cladding 52, which is as thin as possible, has a smaller refractive index than the core 51 and therefore reflects the light which enters the core 51 via the end faces. In order to couple a maximum amount of light from the display device into the fibres, the spaces between the originally round fibres 50 are eliminated by compressing the entrance face, thereby deforming the fibres 50. Instead of round fibres 50 it is possible to employ fibres of triangular, square or hexagonal cross-section. At the entrance face the fibres are provided with an anti-reflection coating in order to minimize reflection of the light to be coupled in. The cladding 52 is suitably provided with a light-absorbing surface in order to preclude cross-talk of light between fibres. As can be seen in the Figure, the fibres 50 are offset relative to each other. This is in order to minimize moiré effects of the pattern of parallel lines written in a picture tube by the electron beam.

What is claimed is:

1. In an image transfer apparatus including an image display device and an image magnifier comprising a plurality of laminar fiber arrays, each fiber array comprising a plurality of fibers, and each fiber having a first end optically coupled to a substantially rectangular entrance face and a second end optically coupled to a substantially rectangular exit face, said first fiber ends in each array having a first predetermined pitch, said second fiber ends in each array having a second predetermined pitch, said second pitch being greater than said first pitch, the fibers in each laminar fiber array being juxtaposed in a plane at said entrance face, said laminar fiber arrays likewise being juxtaposed at said entrance face, the improvement wherein each laminar fiber array has a planar converging portion extending from the second ends of the fibers in an array to a region of initial juxtaposition remote from said entrance face, said second end of each fiber in said fiber array being disposed substantially perpendicular to said exit face, said planar converging portion being disposed at an acute angle relative to said exit face, and said region of initial juxtaposition being arranged at a minimal distance from a line defined by said second fiber ends of said fiber array and having a pitch substantially equal to said first predetermined pitch, the volume defined by the projection extending perpendicular to said entrance face in a direction opposite to the direction of incoming light intersecting the volume defined by the projection extending perpendicular to said exit face in a direction opposite to the direction of outgoing light.

2. The image transfer apparatus as defined in claim 1, wherein one half of the fiber arrays are disposed mirror-symmetrically relative to the other half of the fiber arrays, a mid-plane perpendicular to said substantially rectangular exit face being the plane of symmetry.

3. The image transfer apparatus as defined in claim 1, wherein said exit face comprises a face plate having a light-absorbing layer, said light-absorbing layer having apertures formed therein in which said second ends of said fibers are arranged.

4. The image transfer apparatus as defined in claim 3, wherein a transparent plate is mounted on side exit face, said transparent plate having corrugations formed on the side facing said second fiber ends, which corrugations are arranged substantially parallel to a side of said substantially rectangular exit face.

5. The image transfer apparatus as defined in claim 3, wherein said second ends of said fibers have corrugations formed therein, said corrugations being arranged substantially parallel to a side of said substantially rectangular exit face.

6. The image transfer apparatus as defined in claim 3, wherein each of said second ends of said fibers have an anti-reflection coating formed thereon.

7. The image transfer apparatus as defined in claim 6, wherein a transparent plate is mounted on said exit face, the space between said transparent plate and said corrugations being filled with a paste having a refractive index which is substantially equal to the refractive index of said transparent plate.

8. The image transfer apparatus as defined in claim 4, wherein an anti-reflection coating is formed on the side of said transparent plate remote from said exit face.

9. The image transfer apparatus as defined in claim 1, wherein said fibers are compressed in the vicinity of said first ends such that interstitial spaces between fibers are substantially eliminated.

10. The image transfer apparatus as defined in claim 9, wherein each of said fibers comprises a core and a cylindrical layer of light-absorbing cladding in the vicinity of said first ends, said cores being separated by said cladding.

11. The image transfer apparatus as defined in claim 1, wherein each of said first ends of said fibers has an anti-reflection coating formed thereon.

12. The image transfer apparatus as defined in claim 1, wherein said image display device comprises a light source, a lens arrangement, and a liquid crystal display directly coupled to said entrance face, said light source, lens arrangement and liquid crystal display being arranged within said projection perpendicular to said exit face such that light from said light source is directed onto said liquid crystal display by said lens arrangement.

13. The image transfer apparatus as defined in claim 1, wherein said image display device comprises a plurality of picture tubes, and arrangement of dichroic mirrors, and a lens arrangement all arranged within said projection perpendicular to said exit face such that images from said picture tubes are directed onto said entrance face by said dichroic mirror arrangement and said lens arrangement.

14. The image transfer apparatus as defined in claim 1, wherein said image display device comprises a monochrome picture tube having a face plate coupled directly to said entrance face.

15. The image transfer apparatus as defined in claim 14, wherein said face plate of said picture tube comprises glass fiber.

16. The image transfer apparatus of claim 1 wherein the second ends of the fibers define parallel lines corresponding to respective laminar arrays, the pitch of the lines being greater than the pitch of the laminar arrays at the entrance face.

17. The image transfer apparatus of claim 1 wherein at least some of said laminar arrays extend from said exit face in parallel planes.

* * * * *